June 22, 1926.
F. J. BOND
1,589,507
HINGE
Filed Jan. 7, 1925
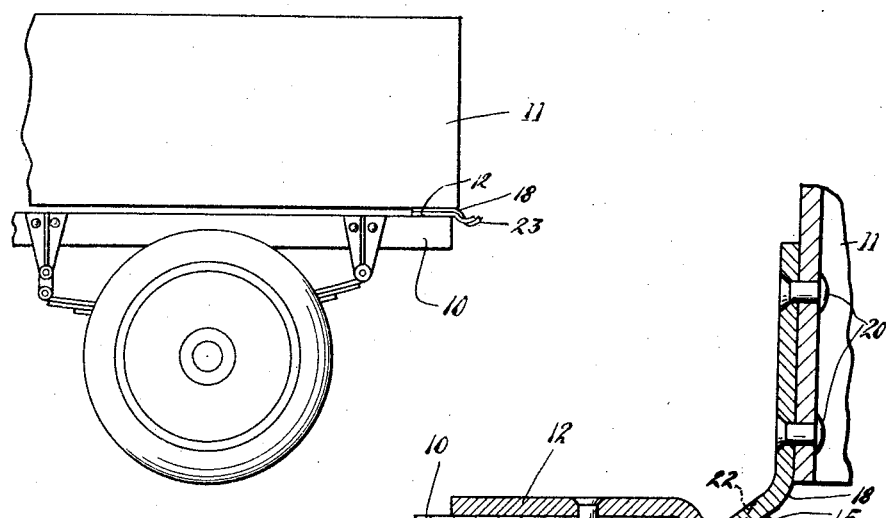
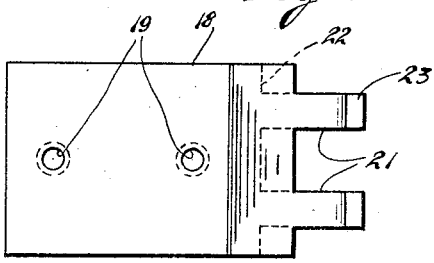
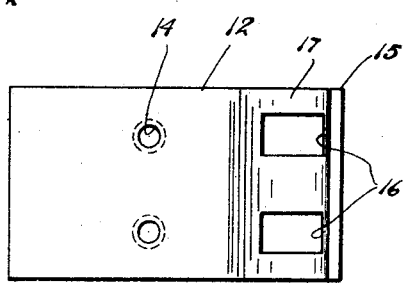
Witnesses:
Inventor:
Frank J. Bond
By Joshua R. H. Potts
His Attorney.

Patented June 22, 1926.

1,589,507

UNITED STATES PATENT OFFICE.

FRANK J. BOND, OF BRAVO, MICHIGAN.

HINGE.

Application filed January 7, 1925. Serial No. 1,003.

My invention pertains to a hinge, and more particularly to a hinge adapted for use on a dump truck or similar vehicle, and has for its object to provide a strong and efficient hinge consisting of separable members which will retain the truck body on the chassis while in its lowered position, and will permit the truck body when raised to be readily removed from the chassis by slightly lifting the same and will also permit said truck body to be slid readily rearwardly away from the chassis, when in such raised position, by a slight rearward pressure upon the truck body or a forward movement of the chassis.

Other objects will appear hereinafter.

The invention consists in the combinations and arrangements of parts hereinafter described and claimed.
The invention will be best understood by reference to the accompanying drawings forming a part of this specification, and in which, Fig. 1 is a side elevation of a portion of a truck, showing my invention applied thereto;

Fig. 2 is an enlarged side view of my invention;

Fig. 3 is a vertical sectional view of the invention;

Fig. 4 is a plan view of the upper hinge member which is attached to the truck body; and Fig. 5 is a plan view of a lower hinge member which is attached to the chassis.

In the drawing I have shown my invention in connection with a dump truck or vehicle including the chassis 10 upon which the truck body 11 is tiltably and removably mounted.

The hinge includes a lower part or member 12 which is secured to the chassis 10 with rivets 13 engaging through openings 14 in said member, or in any suitable manner, said member having its outer or rearward end curved downwardly, then outwardly, and then upwardly at its outer end 15, openings 16 being provided in the lower or dished portion 17 of said hinge member.
The other member 18 of the hinge is provided with openings 19 for receiving rivets or bolts 20 to fasten said member on the truck body 11, and the outward end of said member is bent downwardly, and is provided with outwardly and upwardly curved tongues 21 adapted to be inserted in openings 16 in the other member. Bevelled cutaway portions 22 are provided at the lower side of the curved end of said plate 18, at both sides of tongues 21, to permit the upper member 18 to rest snugly upon the lower member 12 when the truck is in its lowered position, as best shown in Fig. 2. The outer ends 23 of tongues 21 are curved upwardly sufficiently to engage the outer upwardly curved end 15 of member 12, thereby preventing sliding of the members with respect to each other or of the truck upon the chassis when in its lowered position.

It is apparent from the above disclosure that a truck or similar vehicle, equipped with a hinge constructed according to my invention, will have the truck body firmly held in position by the hinge while said body is in its lowered position, and also that the truck body may be readily unloaded from the chassis by one man, and by slightly lifting said truck body upwards when in its raised position, and also that the truck body, when in its raised position, may be readily slid backwards from the chassis by a slight pressure on said body or by a sudden forward movement of the chassis, all due to the particular curvature and arrangement of the ends of the two separable members.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A hinge comprising separable attaching members, one of which is curved downwardly and then upwardly at one end and provided with openings in the dished portion of said end, and the other member is similarly curved downwardly at one end and provided with tongues curved downwardly and then upwardly to extend through said openings and engage the curved end on the other member to positively prevent sliding movement of said members on each other when in their closed or folded position said tongues and end being curved and arranged to permit lifting of one member from the other member when moved from a superposed position through nearly a right angle.

2. A hinge comprising separable members including attaching plates which are superposed in operative position, a downwardly and then upwardly curved end on one plate and having openings in the dished portion of said end, the other plate having a similarly curved end and having tongues curved downwardly and outwardly and then upwardly from said end, said tongues extending through said openings and engaging the outer edge of the first plate, and said second plate being under-cut at the sides of said tongues to rest said members snugly together, said curved parts and said opening being arranged to permit withdrawing the second plate transversely from the first plate when swung at right angles therefrom.

3. A hinge comprising separable members including attaching plates superposed when in operative position, a downwardly and then upwardly curved end on one plate and having openings in the dished portion of said end, the other plate having a similarly curved end and having tongues curved downwardly and outwardly and then upwardly from said end, said tongues extending through said openings and engaging the outer edge of said plate for positively preventing sliding of said members in any direction while said members are superposed, and said ends and tongues being curved to permit ready sliding or lifting of said tongued member from the other member when swung from said superposed position for substantially 90°.

4. A hinge comprising separable members arranged for attachment, respectively, one to a vehicle chassis, and the second to a vehicle body, the first member having a downwardly and outwardly and then upwardly curved end and openings in the dished portion of said end, the second member having its end curved downwardly and having tongues extending therefrom and curved outwardly and upwardly to engage in said openings and at the outer end of said first member, and said ends and tongues being curved to permit ready sliding and removal of said truck body with its hinge member longitudinally of the chassis with its hinge member, when said body is in elevated position.

5. A hinge comprising separable members arranged for attachment, respectively, one to a vehicle chassis, and the second one to a vehicle body, the first member having a downwardly and outwardly and then upwardly curved end and openings in the dished portion of said end, the second member having its end curved downwardly and having tongues extending therefrom and curved downwardly and outwardly and then upwardly to engage in said openings and at the outer end of said first member, said second plate being undercut at the sides of said tongues to rest said members snugly together, and said ends and tongues being curved and arranged to retain said truck body firm while in its lowered position and to permit ready sliding and removal of said truck body with its hinge member longitudinally of the chassis when said body is in elevated position, or swung from said chassis through an angle of approximately 90°.

In testimony whereof I have signed my name to this specification.

FRANK J. BOND.